United States Patent [19]

Ogris

[11] Patent Number: 4,858,847
[45] Date of Patent: Aug. 22, 1989

[54] SENSING AND LOCKING DEVICE FOR A SAFETY BELT SYSTEM

[75] Inventor: Gottfried Ogris, Unterschleissheim, Fed. Rep. of Germany

[73] Assignee: Britax-Kolb GmbH & Co., Dachau, Fed. Rep. of Germany

[21] Appl. No.: 290,829

[22] Filed: Dec. 15, 1988

Related U.S. Application Data

[63] Continuation of Ser. No. 114,653, Oct. 28, 1987, abandoned.

[30] Foreign Application Priority Data

Oct. 29, 1986 [DE] Fed. Rep. of Germany ....... 3636847

[51] Int. Cl.$^4$ .................... B60R 22/38; B60R 22/40
[52] U.S. Cl. .................... 242/107.4 B; 242/107.4 A; 242/107.4 C
[58] Field of Search ................ 242/107.4 B, 107.4 A, 242/107.4 C; 280/806; 297/478, 480

[56] References Cited

U.S. PATENT DOCUMENTS

| | | | |
|---|---|---|---|
| 4,522,350 | 6/1985 | Ernst | 242/107.4 C X |
| 4,560,115 | 12/1985 | Toyama et al. | 242/107.4 B X |
| 4,619,418 | 10/1986 | Butenop | 242/107.4 C X |

Primary Examiner—John M. Jillions
Attorney, Agent, or Firm—Dilworth & Barrese

[57] ABSTRACT

In a webbing sensitive sensor, a rotatably mounted sensing pawl (14) is provided on a peripheral control cam surface (24) of a rotatable inertia mass (13) and is pressed by this surface into engagement with an internal tooth region. This peripheral control cam surface (24) has from a predetermined point an outwardly falling characteristic for reducing the torque exerted by the pawl on the inertia mass, so that the engagement motion between the pawl and the internal tooth region is effective independently of manufacturing tolerances.

8 Claims, 6 Drawing Sheets

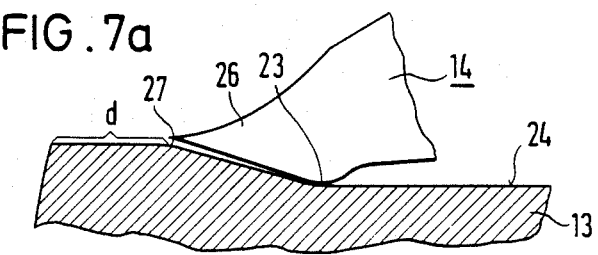
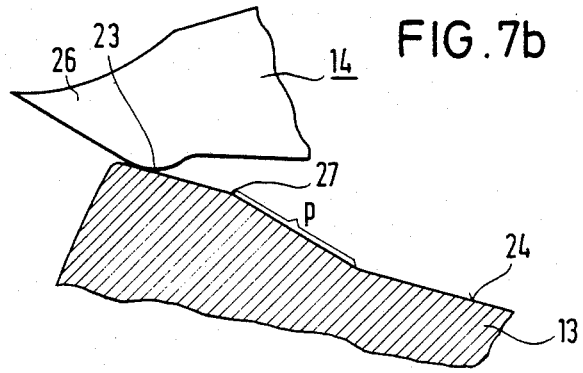
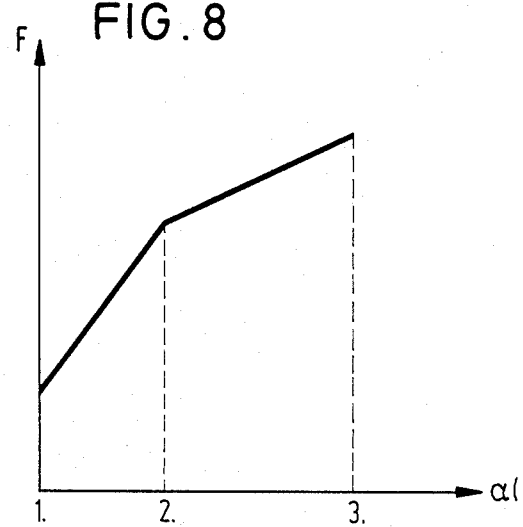

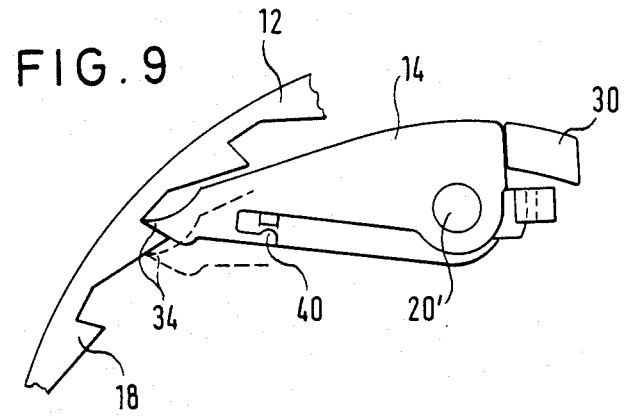
FIG. 9
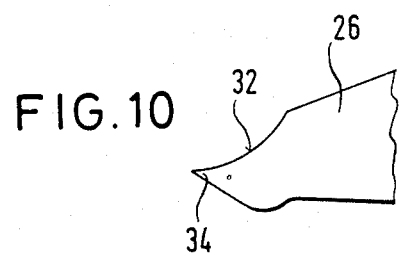
FIG. 10
FIG. 11
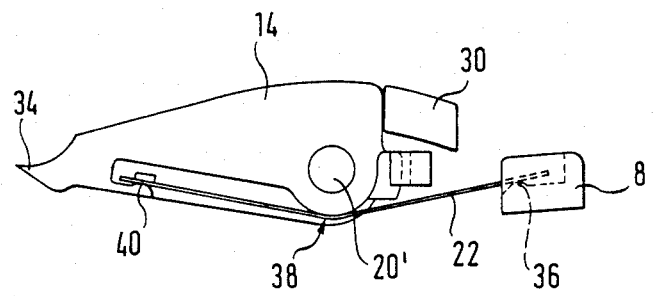

SENSING AND LOCKING DEVICE FOR A SAFETY BELT SYSTEM

This is a continuation of co-pending application Ser. No. 114,653, filed on Oct. 28, 1987, now abandoned.

The invention relates to a sensing and locking device for a safety belt system comprising a rotatable inertia mass, a sensing pawl biased into contact with a peripheral control cam surface of the inertia mass and an internal tooth region into which the sensing pawl can engage controlled by the rotation of the inertia mass.

The problems with which the invention is concerned arise primarily with a webbing sensitive sensor for safety belt systems. With such a sensor, a sensing pawl is secured to a control wheel which rotates together with the spool shaft upon withdrawal of the safety belt. Together with the control wheel, also an inertia mass rotates, which inertia mass is rotatable to a limited extent relative to the control wheel by overcoming a spring. The inertia mass is formed as an inertia disc which is segmentally cut away in a peripheral region so that a peripheral control cam surface is formed which extends substantially perpendicularly to the rotation axis of the inertia disc. The sensing pawl engages with this peripheral control cam surface by means of a cam spaced from its rotation axis. When the inertia disc rotates relative to the control wheel by overcoming a spring, the inertia disc acts with a constant rotational acceleration onto the spring loaded sensing pawl, whereby this pawl slides along the peripheral control cam surface away from the rotational axis of the inertia disc and thus moves with its pawl tooth outwardly into engagement with the internal tooth region.

Manufacturing tolerances in respect of the roundness of the interior crown of the internal tooth region as well as the mounting of the inertia mass and the sensing pawl lead at various peripheral points of the internal tooth region to a differing movement path of the pawl into engagement with the internal tooth region at the various peripheral points independently of the point on the periphery at which the relative movement between the control and inertia disc is initiated. This has the consequence that engagement of the sensing pawl with the internal tooth region takes place at the various peripheral points at varying times.

Therefore, the object of the invention consists in the creation of a sensing and locking device for a safety belt system in which even in the presence of manufacturing tolerances in respect of the roundness of the internal tooth region and the mounting of the inertia mass and the sensing pawl, uniform tooth engagement is ensured at each peripheral point around the entire periphery.

This object is achieved according to the invention in that the peripheral control cam surface slopes downwardly away from a predetermined interface contact point between the sensing pawl and the peripheral cam control surface, which point defines the closest possible non-engagement position between the sensing pawl and the internal tooth region, for reducing the torque on the inertia mass caused by the sensing pawl.

The downwardly inclined characteristic of the peripheral control cam surface fulfils the following purpose. Normally, when the peripheral control cam surface is arranged substantially perpendicular to the rotation axis of the inertia mass, the lever arm which applies the force with reference to the rotation axis of the inertia mass increases, said force acting from the sensing pawl as a normal force on the peripheral control cam surface and thus on the inertia mass, since the contact point between the sensing pawl and the peripheral control cam surface moves outwardly in the event of increasing relative movement between the inertia mass and the control wheel. In the event of increasing spring force from the spring acting on the sensing pawl, the normal force exerted thereby acts as a torque contrary to the constant torque of the inertia disc, that is to say in an increasing sense, since, as already mentioned, the lever arm increases in this case. As a result of the claimed downwardly sloping characteristic of the peripheral control cam surface, from the predetermined point one achieves constancy or even reduction of the said lever arm, and thus an abrupt reduction of the torque, with the consequence that from this point the sensing pawl advances suddenly into its engagement position in the internal tooth region, so that compensation of the said manufacturing tolerances is achieved.

The solution according to the invention is thus based on the recognition that the reaction force in the contact region between the sensing pawl and the inertia mass is responsible for how quickly engagement takes place or when an engagement takes places between the sensing pawl and the internal tooth region. The slope of the falling characteristic depends upon the respective dimensional relationships.

The mentioned starting point for the downwardly inclined characteristic of the peripheral control cam surface is determined according to how near the sensing pawl can be brought to the internal tooth region, having regard to manufacturing tolerances, without any tooth engagement occurring immediately at any peripheral point.

Preferably, the contour of the sensing pawl tip is designed or constructed in such manner (possibly a concave recess) that only the pawl tip makes contact with the internal tooth region or the control disc teeth in the event of activation. Thus, rejections of the pawl are prevented and the pawl, here in particular the webbing sensitive pawl, is drawn into the toothed region of the control disc which results in uniform webbing sensitive characteristics at each position.

Advantageously, at points inside the interface contact point a rising characteristic of the peripheral control cam surface exists with the result that the spring force of the spring acting on the sensing pawl increases earlier and therefore a weaker spring can be employed. This spring is advantageously a leaf spring which has smaller manufacturing tolerances than a coil spring.

The leaf spring is preferably secured on the sensing pawl so that longitudinal motion of the leaf spring at the point where it comes into contact with the sensing pawl is prevented. In this way, frictional losses upon motion of the sensing pawl are considerably reduced. Longitudinal motion of the leaf spring occurs only at the spring mounting outside the sensing pawl, for example if the spring mounting is present on the control wheel.

Advantageously, the sensor according to the invention is a webbing sensitive sensor, i.e. a so-called WS sensor.

The invention will now be described in more detail with reference to some purely schematically illustrated exemplary embodiments in the drawings, in which:

FIG. 7a shows a view similar to FIG. 5a but with modified control cam surface in the rest condition;

FIG. 7b shows a schematic representation according to FIG. 7a but in the completely engaged position of the sensing pawl;

FIG. 8 shows a graph, similar to the graph of FIG. 6, but in respect of the control cam surface according to FIG. 7a and 7b;

FIG. 9 shows a schematic partial view of the engagement region between the internal tooth region and sensing pawl;

FIG. 10 schematically shows the tip section of the sensing pawl; and

FIG. 11 schematically shows the sensing pawl with a leaf spring.

The basic control mechanism will be described in the following with reference to FIGS. 1 to 3.

Figure 1:
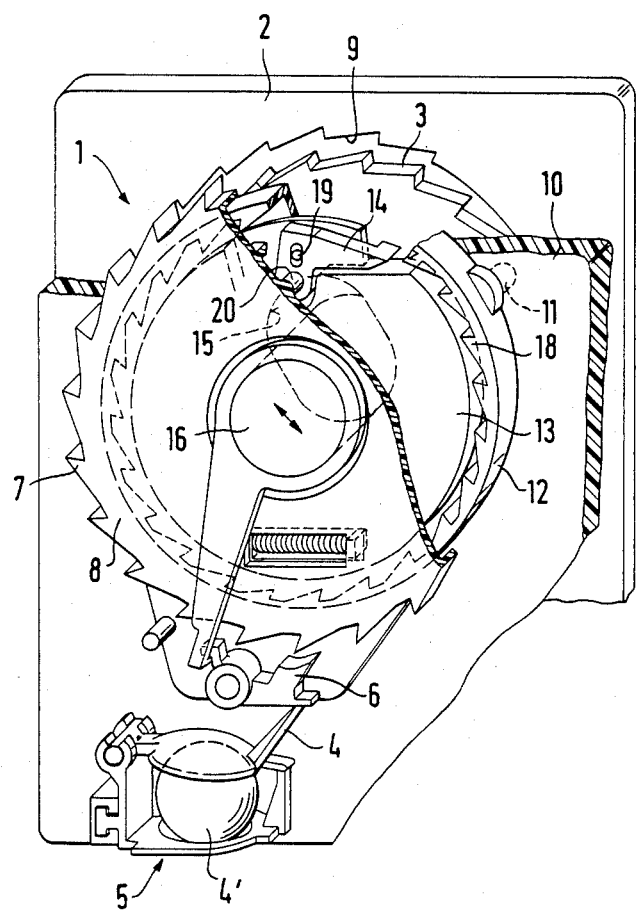
FIG. 1 is a perspective view of a portion of a control mechanism of a belt reel having a webbing sensitive sensor and a vehicle sensitive sensor.

In FIG. 1 is illustrated a part of a control mechanism of a belt reel and it is possible to see particularly well the assembly of the control components, the view being limited to a representation of a left frame limb 2 and a left toothed crown 3 of the shaft 1 guided in the frame limb 2. The belt reel is illustrated in the rest condition. A momentum lever 4 of a vehicle sensitive device 5 having a sensing ball 4' lies on the lower side of a control pawl 6 which in turn engages in an outer toothed region 7 of a control wheel 8. The shaft 1 is not visible in FIG. 2. It is however possible to see the left toothed crown 3 of a toothed region of the shaft which in the rest condition is out of engagement with a toothed region 9 in the left frame arm 2 of the housing. A mechanism base plate 10, in which is located a mounting pin 11 as a fulcrum for a control disc 12, is illustrated in broken line. The entire control disc 12 with the control wheel 8 guided therein and an inertia disc 13 arranged between the control disc 12 and the control wheel 8 is lifted around the mounting pin 11 in an elongate hole 15 in the mechanism base plate 10 from the rest position illustrated in FIG. 1 into the blocking position after successful locking between the control disc 12 and the control wheel 8, which may be initiated selectively by the vehicle sensitive control pawl 6 or by a webbing sensitive pawl 14, a pin 16 of the shaft being moved upwardly to the left in FIG. 1 in the elongate hole 15 and the toothed crown 3 engaging with the toothed region 9 on the housing.

A loaded compression spring 17 between the inertia disc 13 and the control wheel 8 in a corresponding recess ensures that in the rest condition according to FIG. 1 the webbing sensitive pawl 14 remains out of engagement with the internal tooth region 18 of the control disc 12. Only when as a result of the slight withdrawal of the webbing the inertia disc 13 lags behind the movement of the control wheel 8 will relative motion between the inertia disc 13 and the control wheel 8 be achieved, overcoming of the force of the pressure spring 17, so that the pawl pivots outwardly into the internal tooth region 18 of the control disc 12 as a result of relative offset between a pin 19 on the inertia disc 13 and a mounting pin 20 on the control wheel 8. As a result, locking of the belt reel is achieved independently of the vehicle sensitive device, by which the shaft 1 in an exactly defined position of the toothed crown 3 relative to the toothed segment 9 on the housing is raised into the blocking position.

The particular effect of the control pawl 4 acted upon by the vehicle sensitive device 5 and the webbing sensitive pawl 14 acted upon by the inertia disc 13 will be described in more detail with reference to FIGS. 2 and 3.

Figure 2:
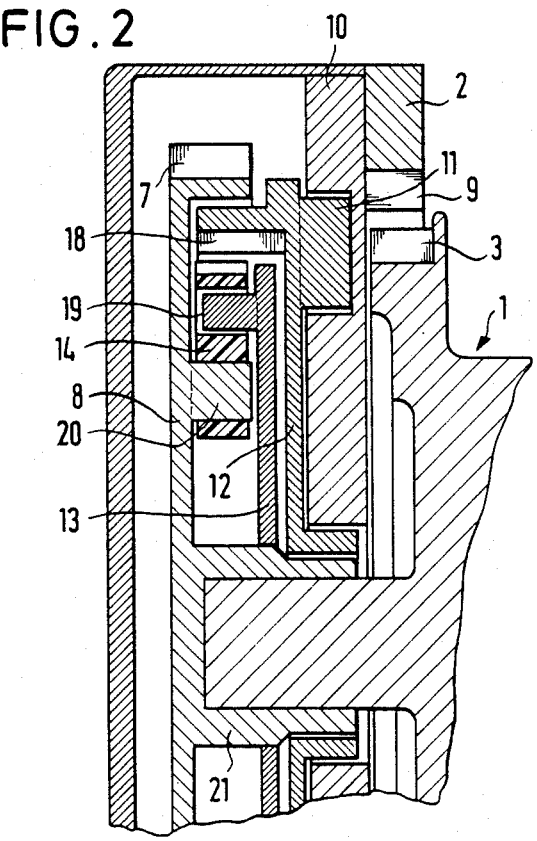
FIG. 2 shows a partial sectional view through the control mechanism according to FIG. 1.
Figure 3:
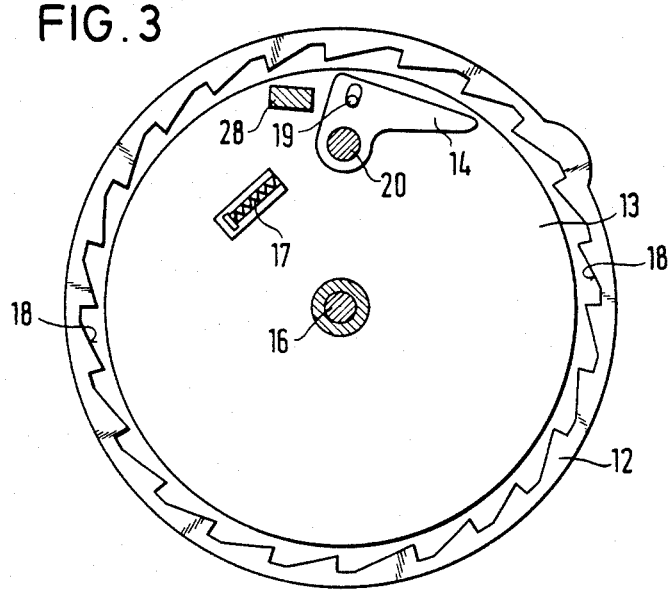
FIG. 3 shows a schematic side view of the webbing sensitive sensor mechanism.

The webbing sensitive locking device consists, as can be seen particularly well from FIGS. 2 and 3, of the inertia disc 13, which is secured for rotation on a cylindrical stub shaft 21 of the control wheel 8, as well as of the pawl 14 which has two holes into which extend a first mounting journal in the form of a pin 19 on the inertia disc 13 and a second mounting journal 20 formed on the control wheel 8. As a result of the relative motion between the inertia disc 13 and the control wheel 8, there results a pivoting motion of the pawl 14 as shown in FIG. 3 outwardly into the internal tooth region 18 of the control disc 12, when, upon rapid belt withdrawal the control wheel 8 is withdrawn from the shaft in the clockwise sense in FIG. 3 beyond a certain acceleration value and in this connection takes the second mounting journal 20 for the pawl 14 with it, and thus the pawl is pivoted into the internal tooth region 18. When the pawl 14 has reached its locking position, which is not indicated in FIGS. 1 and 3, the pin 19 on the inertia disc 13 is unloaded by the contact of the rear side of the pawl 14 on a stop 28 which is formed on the control wheel 8.

When the locking condition produced by the webbing sensitive arrangement is thus achieved, the locked combination of the control disc 12, inertia disc 13 and control wheel 8 together with the shaft 1 moves against the effect of springs which are not illustrated into the blocking position.

As can be seen from FIG. 3, the pin 19 engages into an elongate hole of the webbing sensitive pawl 14 and thus pivots the latter outwardly if the inertia disc 13 lags behind the movement of the control wheel 8, when the belt is withdrawn from the shaft 1. Should this withdrawal exceed an acceleration limit value settable by means of the spring 17, the inertia disc 13 possesses sufficient power of inertia to overcome the effect of the spring 17. In this way the pawl 14 moves outwardly and in the above described manner makes engagement with the teeth of the internal tooth region 18 of the control disc 12. Further tension on the belt then produces pivoting of the control disc 12 and complete blocking of the shaft 1 in the described manner.

The reliable operation of the belt reel is dependent upon the exact dimensioning of the pawls which initiate locking. As a result of the material properties of the synthetic material employed for the pawl construction, particular attention must be given to ensure that even in the event of high temperatures and possible deformation caused thereby the components continue to operate reliably particularly under pressure from the belt reel.

Figure 4:
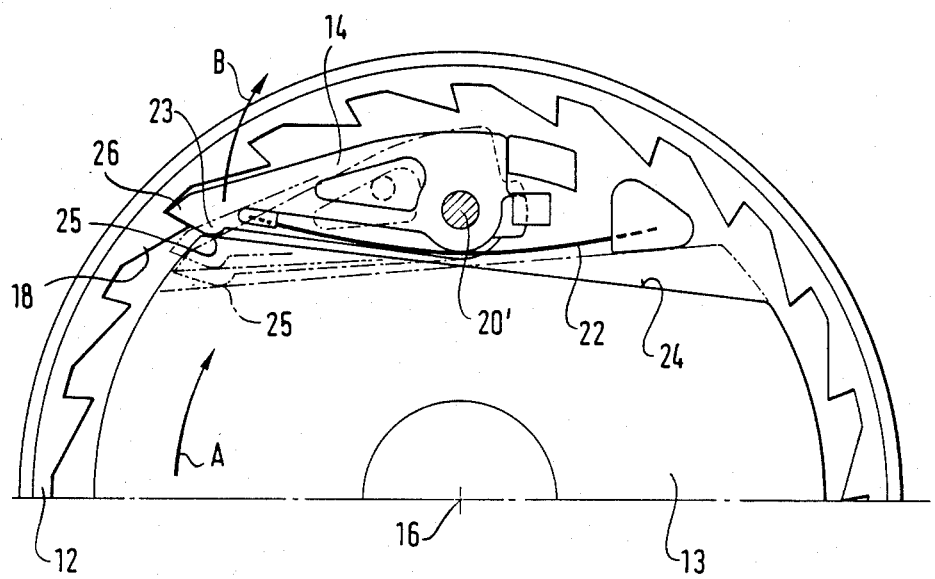
FIG. 4 shows a schematic partial side view of a webbing sensitive sensing mechanism comprising a somewhat modified activation mechanism.

FIG. 4 shows a somewhat modified control mechanism of the webbing sensitive sensor. The webbing sensitive pawl 14 is here pivoted on the control wheel but engages under the effect of a leaf spring 22 with a projection 23 on a straight peripheral control cam surface 24, as illustrated according to the solid lines in FIG. 4, that is to say in the event of complete engagement of the webbing sensitive pawl 14. This peripheral control cam surface 24 extends perpendicular to the rotation axis 16 of the inertia disc 13. The inertia disc 13 is represented together with the associated pawl 14 in chain dotted line in the initial position (rest position) and in an intermediate position in which still no tooth engagement has occurred. It may also be clearly seen from the drawing that with increasing rotation of the inertia disc 13 about the rotation axis 16 according to the arrow A, the projection 23 of the pawl 14 moves outwardly along the peripheral control cam surface 24 (i.e. the contact point 25 moves outwardly) and the pawl 14 rotates according to the arrow B about its rotation axis 20'. This has the consequence that the engagement tooth 26 of the pawl 14 approaches the internal tooth region 18 until it reaches the completely engaged position according to the solid lines in FIG. 4.

Via the leaf spring 22, at the position of the contact point 25 the pawl exerts a normal force on the peripheral control cam surface 24 of the inertia disc 13 and this normal force produces a torque against the arrow direction A with a predetermined lever arm. In the representation in FIG. 4, the associated lever arm considerably increases although at a constant rotational acceleration of the inertia disc the driving torque of the inertia disc 13 remains constant.

Figure 5A:
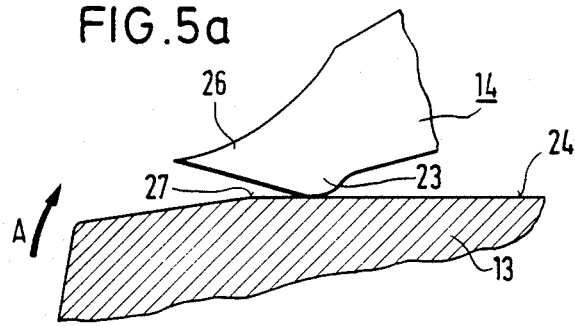
FIG. 5a shows a schematic partial view of the inertia mass and sensing pawl in the rest position.

According to the representation in FIG. 5a, the peripheral control cam surface 24 has, proceeding from an interface contact point 27, a falling characteristic visible from the drawing with the effect that torque exerted by the webbing sensitive pawl on the inertia disc reduces from this point upon further rotation of the inertia disc 13 in the direction of the arrow A and thus from this point the pawl 14 advances quickly into full engagement with the internal tooth region 18, since the corresponding reaction force in the contact region between the pawl and the inertia disc is responsible for how quickly engagement takes place or when an engagement between the toothed region 18 and the pawl 14 takes place. The interface contact point 27 corresponds to the position of the engagement tooth 26 of the pawl 14 at which on all teeth of the internal tooth region still no engagement has occurred. As a result of this abrupt rapid engaging movement of the pawl, manufacturing tolerances and path differences of the pawl are compensated in respect of time and thus uniform engagement conditions are effective at all peripheral points.

Figure 5B:
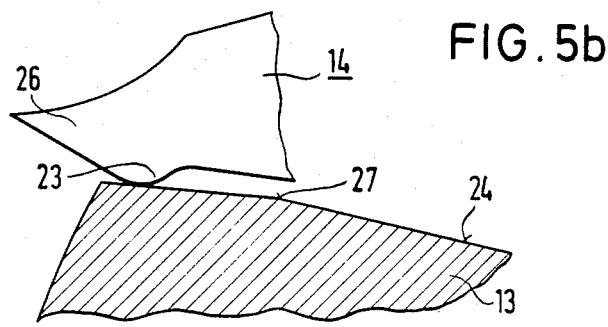
FIG. 5b shows a schematic representation according to FIG. 5a but with completely engaged sensing pawl.
Figure 6:
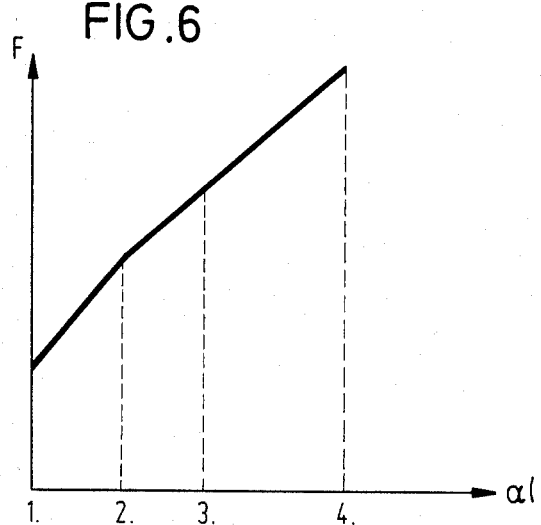
FIG. 6 shows a graph of force variation against the degree of rotation of the inertia mass on the abscissa.

FIG. 6 shows a graph of the relationship between the force change and the rotation of the inertia mass at four rotational positions, rotational position 1 corresponding to the rest condition of FIG. 5a, rotational position 2 corresponding to the force change as a result of the sloping characteristic, rotational position 3 corresponding to the contact between the pawl tip and the internal tooth region, and rotational position 4 corresponding to the completely engaged pawl according to FIG. 5b.

In the modified embodiment according to FIG. 7a and 7b, the overall control cam surface 24 possesses a first plane of slope d and within an interior portion of said surface, and a second plane of slope p which is of increased slope relative to slope d. This has the consequence that upon rotation of the inertia disc 13 the spring 22 is deflected earlier and the spring force is increased earlier. This permits the use of a lighter or weaker spring. The relationship between the rotation of the inertia mass and the change of the force F is illustrated schematically in FIG. 8, in a comparable manner to that in FIG. 6. The rotational position points on the abscissa designate the rest condition according to FIG. 7a (1), the contact of the pawl tip 26 and the toothed region 18 and the force change caused by the falling contour of the inertia mass (2) and the completely engaged pawl according to FIG. 7b (3).

From FIG. 9 it may be seen that the sensing pawl 14 comes into contact with a stop 30 in its locking position. Likewise from FIG. 9 the engagement of the pawl tip may be seen in broken lines. The pawl is provided in its tip region 26 with a concave recess 32 which tapers into a very sharp tip 34 of the sensing pawl 14. Only this actual tip of the sensing pawl comes into contact with the teeth 18 of the control disc 12 in the event of engagement. As a result, pawl rejections are prevented and the webbing sensitive pawl is drawn into the toothed region of the control disc 12 which leads to uniform WS values, i.e. webbing sensitive values at each position.

In FIG. 10 is illustrated once more the actual pawl tip 26 with the hollow cavity 32 and the tip 34, at a larger scale.

FIG. 11 shows the sensing pawl 14 together with the already described leaf spring 22. The leaf spring 22 is supported at one end for longitudinal displacement on a mounting 36 of the control wheel 8, i.e. relative motion between the leaf spring 22 and the control wheel is possible in this region. No relative motion between the leaf spring 22 and the pawl 14 takes place in the region 38 where the leaf spring is deflected in the region of the axis 20', in order to produce bias, and at a spring mounting 40 at the other end of the leaf spring, since the leaf spring is so secured in this spring mounting 40 of the pawl 14 that longitudinal motion of the leaf spring relative to the pawl 14 is there not possible.

As a result, further friction losses on the webbing sensitive pawl are prevented. As already stated, longitudinal motion of the leaf spring occurs only at the spring mounting 36.

I claim:

1. Sensing and locking device for a safety belt system which comprises:
   (a) a frame possessing an opening, said opening possessing an internally toothed periphery;
   (b) a rotatable shaft for winding the safety belt, one end of the shaft traversing the opening in the frame;
   (c) a crown possessing an externally toothed periphery, said crown being supported upon the shaft and positioned proximate to said end thereof such that when the shaft is in a first, or non-locking, position, the shaft rotates freely and when the shaft has been displaced from said first position to a second, or locking, position, the externally toothed periphery of said crown achieves locking engagement with the internally toothed periphery of the opening in the frame;
   (d) a control wheel supported upon said end of the shaft and possessing an externally toothed periphery;
   (e) a control disc pivotally mounted at its periphery to the frame and possessing an opening traversed by the shaft, said opening possessing an internally toothed periphery, pivotal movement of said control disc causing the displacement of the shaft from the first position to the second position;

(f) an inertia disc supported upon the shaft and possessing a peripheral stepped cam control surface, said inertia disc being capable of rotational movement relative to the control wheel upon a sensed withdrawal of the safety belt from the shaft, said inertia disc being positioned on the shaft between the control wheel and the control disc; and, (g) a safety belt withdrawal-sensing first pawl pivotally mounted upon the control wheel proximate the periphery thereof, said first pawl being biased into engagement with the peripheral stepped cam control surface of the inertia disc and away from engagement with the internally toothed periphery of the opening in the control disc when the shaft is in the first position, and engaging the internally toothed periphery of the opening in the control disc when the shaft has been displaced from the first to the second position by movement of the inertia disc relative to the control wheel, said peripheral stepped cam control surface sloping away from a predetermined interface contact point between the first pawl and said control surface thereby defining the closest possible on-engagement position between the first pawl and the internal toothed region of the opening in the control disc.

2. The sensing and locking device of claim 1 further comprising:

(h) an inertia-responsive sensing means supported by the frame; and, (i) a second pawl, the operation of which is mediated by the inertia-responsive sensing means such that in the idle condition of said inertia-responsive means, the second pawl is biased away from engagement with the external toothed periphery of the control wheel and in the active condition of said inertia-responsive means, the second pawl engages said externally toothed region.

3. Sensing and locking device according to claim 1 wherein the peripheral stepped control cam surface slopes upwardly at positions inside the interface contact point through a predetermined distance.

4. Sensing and locking device according to claim 1 wherein the sensing pawl is biased by a leaf spring.

5. Sensing and locking device according to claim 4 wherein the leaf spring is secured on the sensing pawl for preventing relative longitudinal motion.

6. Sensing and locking device according to claim 5 wherein the leaf spring is supported for longitudinal motion at a point outside the sensing pawl.

7. Sensing and locking device according to claim 1 wherein the sensor is a webbing-sensitive sensor.

8. Sensing and locking device according to claim 1 wherein only the actual pawl tip comes into contact with the internal tooth region upon engagement.

* * * * *